G. H. WHITELEY, Jr.
MEANS FOR MOLDING ARTIFICIAL TEETH.
APPLICATION FILED JUNE 18, 1913.
1,290,448.
Patented Jan. 7, 1919.
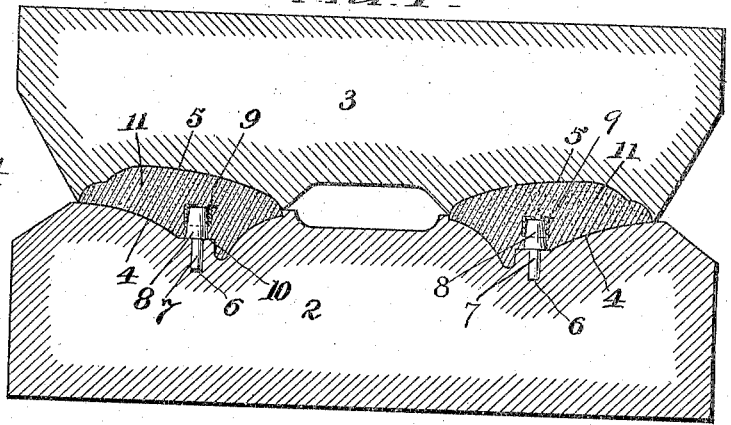
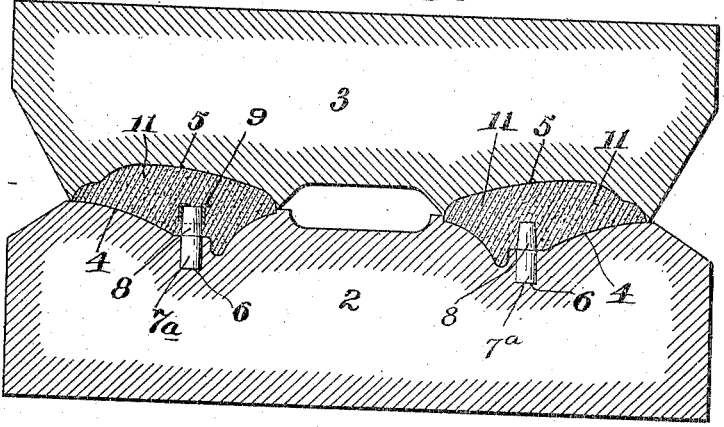
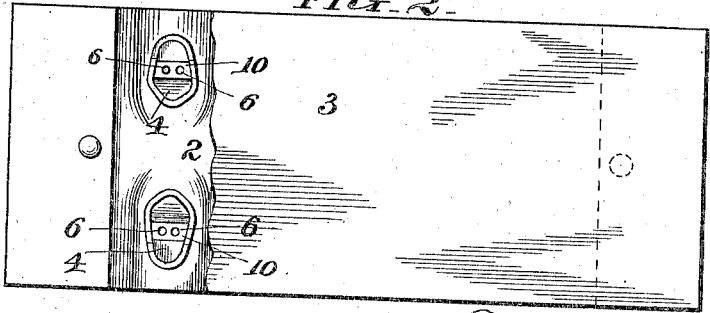
Witnesses
Daniel Webster Jr.
E. W. Smith
Inventor
George H. Whiteley Jr.
By
Attorney

UNITED STATES PATENT OFFICE.

GEORGE H. WHITELEY, JR., OF YORK, PENNSYLVANIA, ASSIGNOR TO THE DENTISTS' SUPPLY COMPANY, A CORPORATION OF NEW YORK.

MEANS FOR MOLDING ARTIFICIAL TEETH.

1,290,448.

Specification of Letters Patent.

Patented Jan. 7, 1919.

Application filed June 18, 1913. Serial No. 774,288.

*To all whom it may concern:*

Be it known that I, GEORGE H. WHITELEY, Jr., citizen of the United States, and resident of York, county of York, and State of Pennsylvania, have invented an Improvement in Means for Molding Artificial Teeth, of which the following is a specification.

The object of my invention is to provide a suitable construction of mold in which to mold artificial teeth in such manner that the same mold may be employed in which to mold the teeth with pin holes having metallic anchors therein to which to solder pins, or with the pins directly molded into the bisque material of which the molded teeth are composed, said molded teeth being subsequently fired for fusing the bisque or vitreous material.

Heretofore, it has been necessary to provide two sets of molds, one to provide molded teeth having the anchors and holes therein, to which anchors the pins are subsequently soldered, and the other to provide molded teeth in which the ends of the pins are molded into the body of the tooth; and as there are large varieties of styles or forms of teeth to be molded, the necessity for duplicate sets of these molds is very costly. By my improvements, the same mold may be employed for molding teeth with holes or with anchors or pins molded therein, or both, as desired, thereby reducing the cost to approximately one-half.

In the general construction of my improved mold, I provide the upper and lower halves of the mold with carefully formed abutting edges bounding recessed portions, which provide the hollow space constituting the mold proper for the tooth, and in the face of one of these hollow mold spaces, I provide one or more holes fitted with freely removable metal or indestructible posts or studs adapted to support upon their ends, which project up into the mold space, suitable anchors which are thus held in elevated position and embedded in the bisque material of which the tooth is molded. The said posts or studs are freely removable from the molds for a two-fold purpose, namely, to enable the post or stud to be drawn out of the mold with the delicate molded bisque tooth and subsequently separated from it, and to provide a suitable hole in the mold body when removed therefrom to form a support for a pin which is to be molded into the bisque body and permanently and directly secured in position therein when the tooth is fired.

In normal use of the molds, they are in condition to be employed for the production of the teeth in either of the above two forms. In both cases, the bisque teeth, when molded, have a pin or stud embedded in their material, but in the case of the use of the anchor, or cavity without an anchor, the stud employed is withdrawn before firing.

My invention also comprehends details of construction which, together with the features above set out, will be better understood by reference to the accompanying drawings, in which:

Figure 1 is a transverse sectional elevation of a mold embodying my invention; Fig. 2 is a plan view of the same with a part of the upper mold portion broken away to show the lower mold portion; Fig. 3 is a transverse sectional elevation, similar to Fig. 1, showing a slightly modified form of the removable studs or posts; Fig. 4 is a perspective view of one of the posts shown in Fig. 1; Fig. 5 is a perspective view of the anchor shown in Fig. 1; and Fig. 6 is a perspective view of the form of post or stud shown in Fig. 3.

2 and 3 are the two parts of the mold and are made of metal and fitted to meet upon definite lines of contact constituting the boundary or outline of the molds for the teeth. As commonly made, each mold is so formed as to simultaneously mold a full set of teeth, but it is not essential to my invention as it will be manifest that, if desired, a separate mold may be made for each tooth. The mold parts 2 and 3 may be held in a proper alinement by the usual holes and dowel pins or otherwise.

The mold parts 2 and 3 are respectively provided with recessed portions 4 and 5 which provide between them the hollow tooth space or chamber in which the bisque tooth is molded, as indicated at 11. The portion 4 of the mold space may be provided with a flattened part or floor 10 in which is provided one or more holes 6 extending down into the mold body 2 to a distance, at least equal to the extent to which a pin would be required to project beyond the back surface of the finished tooth, for reasons which will be presently explained.

Referring more particularly to Fig. 1, the holes 6 in the floor 10 receive the shank 7 of the stud 8, which latter also projects into the tooth space of the mold. The stud part 8 is of larger diameter than its shank 7 and thereby provides an annular shoulder 8ᵃ (Fig. 4) which rests upon the floor 10 and definitely determines the extent of projection of the stud. This also makes a close fit between the stud and floor and thereby insures a clean molded hole in the tooth leading to the anchor. The diameter of the shank 7 is approximately what would be the normal diameter of a pin such as may be used in the finished tooth, and the stud 8 is preferably tapering so as to be easily withdrawn from the molded tooth 11. The shank 7 is, moreover, made to loosely fit in the holes 6, so that when the teeth are molded and the mold parts 2 and 3 are separated, the tooth and with it, the stud, may drop out by simply turning the mold part 2 upside down.

The top of the stud 8 receives the anchor 9 (Fig. 5), which rests upon the end of the stud and approximately fits its body part. When the tooth is molded and removed from the mold, the shank 7 is caught and the stud portion 8 withdrawn from the molded tooth, the taper of the stud permitting easy withdrawal without rupturing the delicate molded tooth structure. The anchor 9 remains in the tooth when the stud 8 is withdrawn and is subsequently heated with the bisque when firing the tooth and is permanently secured in place. In the tooth prepared in this manner, a pin, without a head or with a head may be inserted and soldered to the anchor 11 in the well known manner. The anchor 9 is usually formed of platinum, because of its capacity to withstand the heat of the subsequent firing and its proof against oxidizing.

If it is not desired to form the teeth with the anchors 9, to which to subsequently solder suitable pins, (including those which could not withstand the temperature required to fuse the bisque), and instead, embed the pin directly in the tooth and fuse the tooth upon it, I may simply insert the pin into the hole 6, allowing its head end to extend up into the tooth space and mold the tooth 11 directly about the pin. In this case, the depth of the hole 6, being exactly the length to which the pin is to extend beyond the tooth surface, will support the pin in exactly the right position. It will be understood therefore that this limitation as to the depth of the hole is an important feature of my invention.

From the foregoing description, it will be understood that with the same mold, the teeth may be molded with anchors or pins as desired, and as far as I am aware, this has never been possible in any other mold.

In the form of my invention shown in Fig. 3, the stud or post 8 has the shank part 7ᵃ which loosely enters the hole 6 of a diameter approximately equal to the largest part of the tapered stud 8; and likewise the hole 6 in the mold part 2 is of correspondingly larger diameter. By this stud, the support of the anchor 9 is the same as before, but as the hole 6 is larger, should it be desired to use the mold for molding pins directly into the bisque as is well-known, the pin to be employed may be of the well known form having a head on both ends. The pin may be received in the hole 6 and rest on the bottom thereof, and with the pin otherwise molded in the tooth as before explained, just as the studs are molded in.

The particular shapes of the pins may be varied and employed with or without a head at its end received in the hole 6, and the part which extends into the body of the tooth may also be modified, so long as it properly holds in the tooth when completed, all of which will be readily understood by those skilled in the art.

In the construction of apparatus and mode of procedure in its use, there is involved a very important method having its special advantage by reason of the fact that an embedded anchor may be provided in the molded tooth simultaneously with the molding of a hole leading thereto, the direct means for securing these two functions or results residing in the removable indestructible pin or stud which is loosely supported in the mold body during the molding operation, and which stud drops out of the mold with the molded tooth and is then withdrawn from the tooth leaving a smooth cleanly molded hole centering down into the anchor forming the base or bottom of the hole. By this method of molding a tooth with an anchor, the delicate structure of the tooth is not injured, because the stud is not required to be withdrawn from the tooth until after it has been shaken from the mold with its attached stud, and then the smooth metal or hard surface and taper of the stud enables easy separation of the stud from the tooth and leaves a dense and smooth surface to the hole so formed which makes a better surface when fused. Furthermore, as the anchor 9 snugly fits over the end of the stud 8 to about one-half of its projection into the hollow mold space and is left in the molded tooth, there is only a relatively small surface of the stud in direct contact with the molded bisque forming the tooth, and hence the stud can easily be withdrawn without disturbing or breaking the delicate tooth structure.

I have shown my improvements in the commercial form preferred, but I do not restrict myself to the details thereof, as these may be modified without departing from the spirit of the invention.

Having now described my invention, what I claim as new and desire to secure by Letters Patent, is:—

1. In a mold for making artificial teeth, a plurality of parts which provide, when assembled, a hollow space approximating the shape of the tooth to be molded, one of said parts having a shallow hole formed therein and opening into the hollow space and bottomed so as to support a stud, said hole of less depth than the transverse tooth space measured in alinement with the hole, in combination with a non-destructible short stud of metal having a smooth surface and very loosely fitting into and seating upon the bottom of the hole in the mold part and extending part way across the tooth space, said stud having that part fitting the hole approximating in length the portion which extends into the tooth space, whereby the weight of the freely detachable stud is exerted upon the tooth to detach it from the mold when inverted and the stud removable from the molded tooth to leave a smooth hole therein without destruction of the stud or tooth.

2. In a mold for making artificial teeth with anchors, a plurality of parts which provide, when assembled, a hollow space approximating the shape of the tooth to be molded, one of said parts having a hole formed therein and opening into the hollow space, said hole being of smaller diameter than the anchor to be embedded in the tooth, in combination with a very freely removable non-destructible stud for supporting the anchor of the tooth during the molding operation having a shank of a diameter to loosely fit into the hole in the mold part so as to be capable of falling therefrom when the mold part is inverted and a portion of larger diameter forming with the shank an annular shoulder which rests upon the face of the mold part about the hole therein and tapered so as to be freely removable from the molded tooth and anchor to which it is temporarily attached during the molding operation.

3. In a mold for molding artificial pin teeth both with the pins directly attached and when secured in place by anchors, a plurality of mold parts having their opposing faces formed with recessed portions which, together in the assembled mold, form a plurality of hollow spaces approximating the shapes of the finished teeth, one of said mold parts having holes respectively opening into each of the plurality of hollow spaces said holes having a depth greatly less than the transverse thickness of the tooth space measured in alinement with the hole in combination with very freely removable non-destructible studs each having a shank of a diameter to loosely fit the holes in the mold part so as to be capable of falling therefrom when the mold part is inverted and each also having a portion of larger diameter forming with the shank an annular shoulder which rests upon the face of the mold part about the hole therein and said portions of larger diameter extending into the tooth spaces and about which the teeth are molded, the said studs being freely removable from the mold with the molded teeth and removable therefrom for providing holes in the teeth.

In testimony of which invention, I hereunto set my hand.

G. H. WHITELEY, Jr.

Witnesses:
PURDON SMITH,
R. M. KELLY.

Copies of this patent may be obtained for five cents each, by addressing the "Commissioner of Patents, Washington, D. C."